(12) United States Patent
Ding et al.

(10) Patent No.: US 10,407,311 B2
(45) Date of Patent: Sep. 10, 2019

(54) ZEOLITES, THE PRODUCTION THEREOF, AND THEIR USES FOR UPGRADING HEAVY OILS

(71) Applicant: Saudi Arabian Oil Company, Dhahran (SA)

(72) Inventors: Lianhui Ding, Dhahran (SA); Essam Al-Sayed, Al-Khobar (SA); Kareemuddin Shaik, Dhahran (SA); Abdennour Bourane, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/821,001

(22) Filed: Nov. 22, 2017

(65) Prior Publication Data

US 2018/0334390 A1 Nov. 22, 2018

Related U.S. Application Data

(60) Provisional application No. 62/507,520, filed on May 17, 2017.

(51) Int. Cl.

| | | |
|---|---|---|
| *B01J 29/06* | (2006.01) | |
| *C01B 39/02* | (2006.01) | |
| *B01J 29/08* | (2006.01) | |
| *B01J 23/28* | (2006.01) | |
| *B01J 23/30* | (2006.01) | |
| *B01J 23/75* | (2006.01) | |
| *B01J 23/755* | (2006.01) | |
| *B01J 35/00* | (2006.01) | |
| *B01J 35/10* | (2006.01) | |
| *B01J 37/08* | (2006.01) | |
| *B01J 29/04* | (2006.01) | |
| *C01B 39/20* | (2006.01) | |
| *C01B 39/04* | (2006.01) | |
| *B01J 29/16* | (2006.01) | |
| *C01B 39/24* | (2006.01) | |
| *C10G 45/04* | (2006.01) | |
| *C10G 47/20* | (2006.01) | |
| *B01J 37/00* | (2006.01) | |
| *B01J 37/20* | (2006.01) | |

(52) U.S. Cl.
CPC ............. *C01B 39/026* (2013.01); *B01J 23/28* (2013.01); *B01J 23/30* (2013.01); *B01J 23/75* (2013.01); *B01J 23/755* (2013.01); *B01J 29/041* (2013.01); *B01J 29/042* (2013.01); *B01J 29/044* (2013.01); *B01J 29/045* (2013.01); *B01J 29/084* (2013.01); *B01J 29/166* (2013.01); *B01J 35/0066* (2013.01); *B01J 35/10* (2013.01); *B01J 35/108* (2013.01); *B01J 35/109* (2013.01); *B01J 35/1019* (2013.01); *B01J 35/1042* (2013.01); *B01J 35/1047* (2013.01); *B01J 35/1057* (2013.01); *B01J 35/1061* (2013.01); *B01J 35/1066* (2013.01); *B01J 35/1085* (2013.01); *B01J 37/08* (2013.01); *C01B 39/04* (2013.01); *C01B 39/205* (2013.01); *C01B 39/24* (2013.01); *C10G 45/04* (2013.01); *C10G 47/20* (2013.01); *B01J 35/1023* (2013.01); *B01J 37/0018* (2013.01); *B01J 37/20* (2013.01); *B01J 2029/081* (2013.01); *B01J 2229/14* (2013.01); *B01J 2229/16* (2013.01); *B01J 2229/183* (2013.01); *B01J 2229/186* (2013.01); *B01J 2229/20* (2013.01); *B01J 2229/32* (2013.01); *B01J 2229/38* (2013.01); *B01J 2229/40* (2013.01); *B01J 2229/42* (2013.01); *B01J 2229/62* (2013.01)

(58) Field of Classification Search
CPC ...... C01B 39/04; C01B 39/205; B01J 29/041; B01J 29/042; B01J 29/044; B01J 29/045; B01J 2229/16; B01J 2229/186; B01J 2229/20; B01J 2229/32; B01J 2229/38; B01J 2229/42; B01J 35/1061; B01J 35/109
USPC ...... 502/60, 64, 66, 74, 79, 85, 86; 423/701, 423/704, 716
See application file for complete search history.

(56) References Cited

U.S. PATENT DOCUMENTS

| | | | | |
|---|---|---|---|---|
| 4,503,023 | A * | 3/1985 | Breck | ...................... B01J 29/06 423/715 |
| 5,451,391 | A * | 9/1995 | Di Renzo | ................ B01J 20/18 208/111.15 |
| 8,486,369 | B2 | 7/2013 | Garcia-Martinez et al. | |
| 2008/0227628 | A1 | 9/2008 | Le Van Mao | |
| 2010/0190632 | A1* | 7/2010 | Dight | ....................... B01J 29/06 502/56 |
| 2010/0196263 | A1* | 8/2010 | Garcia-Martinez | ......................... C01B 39/026 423/713 |

(Continued)

OTHER PUBLICATIONS

Garcia-Martinez et al., "Mesostructured zeolite Y-high hydrothermal stability and superior FCC catalytic performance", Catal. Sci. Technol., vol. 2, pp. 987-994, 2012.

(Continued)

*Primary Examiner* — Elizabeth D Wood
(74) *Attorney, Agent, or Firm* — Dinsmore & Shohl LLP

(57) ABSTRACT

According to one or more embodiments disclosed herein, a mesoporous zeolite may be made by a method comprising contacting an initial zeolite material with ammonium hexafluorosilicate to modify the framework of the initial zeolite material, and forming mesopores in the framework-modified zeolite material. The contacting may form a framework-modified zeolite material. The mesoporous zeolites may be incorporated into catalysts.

20 Claims, 2 Drawing Sheets

(56) References Cited

U.S. PATENT DOCUMENTS

| | | | |
|---|---|---|---|
| 2011/0108459 A1* | 5/2011 | Simon | B01J 29/084 208/89 |
| 2011/0171121 A1* | 7/2011 | Senderov | C01B 39/026 423/704 |
| 2012/0024776 A1* | 2/2012 | Garcia-Martinez | B01J 20/18 210/500.25 |
| 2012/0205286 A1* | 8/2012 | Francis | B01J 29/146 208/89 |
| 2012/0258852 A1* | 10/2012 | Martinez | B01J 29/041 502/60 |
| 2013/0090233 A1* | 4/2013 | Simon | B01J 29/084 502/74 |
| 2013/0183230 A1* | 7/2013 | Li | C01B 39/026 423/701 |
| 2013/0183231 A1* | 7/2013 | Senderov | B01J 29/18 423/701 |
| 2014/0128246 A1* | 5/2014 | Garcia-Martinez | B01J 29/043 502/73 |
| 2014/0213432 A1* | 7/2014 | Martinez | B01J 29/04 502/68 |
| 2016/0017238 A1* | 1/2016 | Stamires | B01J 29/084 585/469 |
| 2017/0190587 A1* | 7/2017 | Li | C01B 39/06 |

OTHER PUBLICATIONS

Garcia-Martinez et al., "A mesostructured Y zeolite as a superior FCC catalyst—from lab to refinery", Chem. Commun. vol. 48, pp. 11841-11843, 2012.

Kim et al., "Oligomerization and isomerization of dicyclopentadiene over mesoporous materials produced from zeolite beta", Catalysis Today 232, pp. 69-74, 2014.

Li et al., "Realizing the Commercial Potential of Hierarchical Zeolites: New Opportunities in Catalytic Cracking", Chem Cat Chem, vol. 6, pp. 46-66, 2014.

Ma et al., "A review of zeolite-like porous materials", Microporous and Mesoporous Materials, vol. 37, pp. 243-252, 2000.

Meng et al., "Templating route for synthesizing mesoporous zeolites with improved catalytic properties", Nano Today, vol. 4, pp. 292-301, 2009.

Zhang et al., "Innovations in hierarchical zeolite synthesis", Catalysis Today, vol. 264, pp. 3-15, 2016.

International Search Report and Written Opinion pertaining to PCT/US2018/030435 dated Jul. 20, 2018.

Alsobaai et al., "Hydrocracking of Gas Oil using USY-Zeolite-Based Catalyst", Proceedings of the 1st Int'l Conference on Natural Resources Engineering & Technology, Jul. 24-25, 2006, Putrajaya, Malaysia, 243-254.

Ding et al., "Hydrotreating of Light Cycle Oil Using WNi Catalysts Containing Hydrothermally and Chemically Treated Zeolite Y", Catalysis Today, 2007, 125, 229-238.

Qin et al., "Mesoporous Y Zeolite with Homogeneous Aluminum Distribution Obtained by Sequential Desilication-Dealumination and its Performance in the Catalytic Cracking of Cumene and 1,3,5-triisopropylbenzene", Journal of Catalysis, 2011, 278, 266-275.

Li et al., "Defects in AHFS-dealuminated Y Zeolite: A Crucial Factor for Mesopores Formation in the Following Base Treatment Procedure", Microporous and Mesoporous Materials, 2018, 255, 242-252.

* cited by examiner

ZEOLITES, THE PRODUCTION THEREOF, AND THEIR USES FOR UPGRADING HEAVY OILS

CROSS-REFERENCE TO RELATED APPLICATIONS

This application claims the benefit of U.S. Provisional Application Ser. No. 62/507,520, filed Feb. May 17, 2017.

BACKGROUND

Field

The present disclosure relates to zeolites and, more specifically, to zeolites that may be suitable for use in the treatment of heavy oils, including crude oils, using a catalytic pretreatment process.

Technical Background

Ethylene, propylene, butenes, butadiene, and aromatic compounds such as benzene, toluene, and xylene are basic intermediates for a large portion of the petrochemical industry. They are mainly obtained through the thermal cracking (sometimes referred to as "steam pyrolysis" or "steam cracking") of petroleum gases and distillates such as naphtha, kerosene, or even gas oil. These intermediate compounds may also be produced through refinery fluidized catalytic cracking (FCC) processes, where heavy feedstocks such as gas oils or residues are converted. For example, an important source for propylene production is refinery propylene from FCC units. However, the distillate feedstocks such as gas oils or residues are usually limited and result from several costly and energy intensive processing steps within a refinery.

However, as demands rise for these basic intermediate compounds, other production sources must be considered beyond traditional thermal cracking processes utilizing petroleum gases and distillates as feedstocks.

BRIEF SUMMARY

Accordingly, in view of the ever growing demand of these intermediary petrochemical products such as butene, there is a need for processes to produce these intermediate compounds from other types of feedstocks that are available in large quantities and/or at relatively low cost. The present disclosure is related to the production of mesoporous zeolites such as mesoporous zeolite Y that, according to one or more embodiments, may be utilized in processes and systems for producing these intermediate compounds, sometimes referred to in this disclosure as "system products," by the direct conversion of heavy oil feedstocks such as crude oil. Conversion from a crude oil feedstock may be beneficial as compared with other available feedstocks in producing these intermediate compounds because crude oil may generally be less expensive and/or more widely available than other feedstock materials.

According to one or more embodiments, heavy oil may be cracked to form system products such as light olefins, such as butene, by steam cracking. However, steam cracking of heavy oils can lead to increased coking, which may require the shutdown of a refining operation for coke removal. Additionally, the relatively high amount of aromatics in heavy oils may cause the steam cracking of heavy oils to form undesirable products and relatively low light olefin content. In some cases, polyaromatics present in the heavy oil feedstock may be unconvertible by steam cracking. It has been found that pretreating the heavy oil feedstock to reduce or remove aromatics and other unwanted species, such as one or more of metals, sulfur, and nitrogen, can increase the production of light olefins and decrease coking. Such a pretreatment, according to one or more embodiments, may comprise one or more of hydrodemetalization, hydrodenitrogenation, hydrodesulfurization, or hydrocracking of aromatics.

Conventional hydrotreating catalysts, due at least in part to their relatively weak acidity, may not effectively convert polyaromatics and saturated polyaromatics. Hydrocracking catalysts with zeolite as the key cracking component, such as those used in hydrocracking, may have much stronger acidity than conventional hydrotreating catalysts, and may be able to greatly enhance the conversion of aromatics. However, the pore opening of the conventional zeolites may be too small to allow the relatively large molecules in the heavy oil feedstock to diffuse into the active sites located inside the zeolite.

It has been discovered that an efficient way to solve this problem (that is, the problem of increasing aromatics conversion for relatively large molecules present in a heavy oil stream) is to include mesopores in the zeolite, increasing the zeolite pore size. For example, increased pore size can be achieved, in one or more embodiments, by the incorporation of mesopores in a previously formed zeolite crystal.

According to embodiments disclosed herein, zeolite Y which comprises mesopores may be produced and utilized as a hydrocracking catalyst. As is described herein, in some embodiments, with the presently described zeolite Y as a bottom-bed hydrocracking catalyst, the 540° C.+ fraction in hydrotreated Arab light crude can be partially or even completely converted to light fractions with high percentage of paraffin content. Additionally, in some embodiments, the presently described, zeolite Y can be produced with a reduced synthesis time and with a reduced number of synthesis steps as compared with other zeolite catalysts.

According to one or more embodiments, a mesoporous zeolite may be made by a method comprising contacting an initial zeolite material with ammonium hexafluorosilicate to modify the framework of the initial zeolite material, and forming mesopores in the framework-modified zeolite material. The contacting may form a framework-modified zeolite material. The initial zeolite material may comprise silica and alumina, and may comprise an FAU framework type structure.

According to one or more additional embodiments, a catalyst may be made by a method comprising forming a mesoporous zeolite and incorporating the mesoporous zeolite with a metal oxide support material and one or more metal catalyst materials to form the catalyst. The mesoporous zeolite may be formed by a method comprising contacting an initial zeolite material with ammonium hexafluorosilicate to modify the framework of the initial zeolite material, and forming mesopores in the framework-modified zeolite material to form a mesoporous zeolite. The contacting may form a framework-modified zeolite material. The initial zeolite material may comprise silica and alumina, and may comprise an FAU framework type structure.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
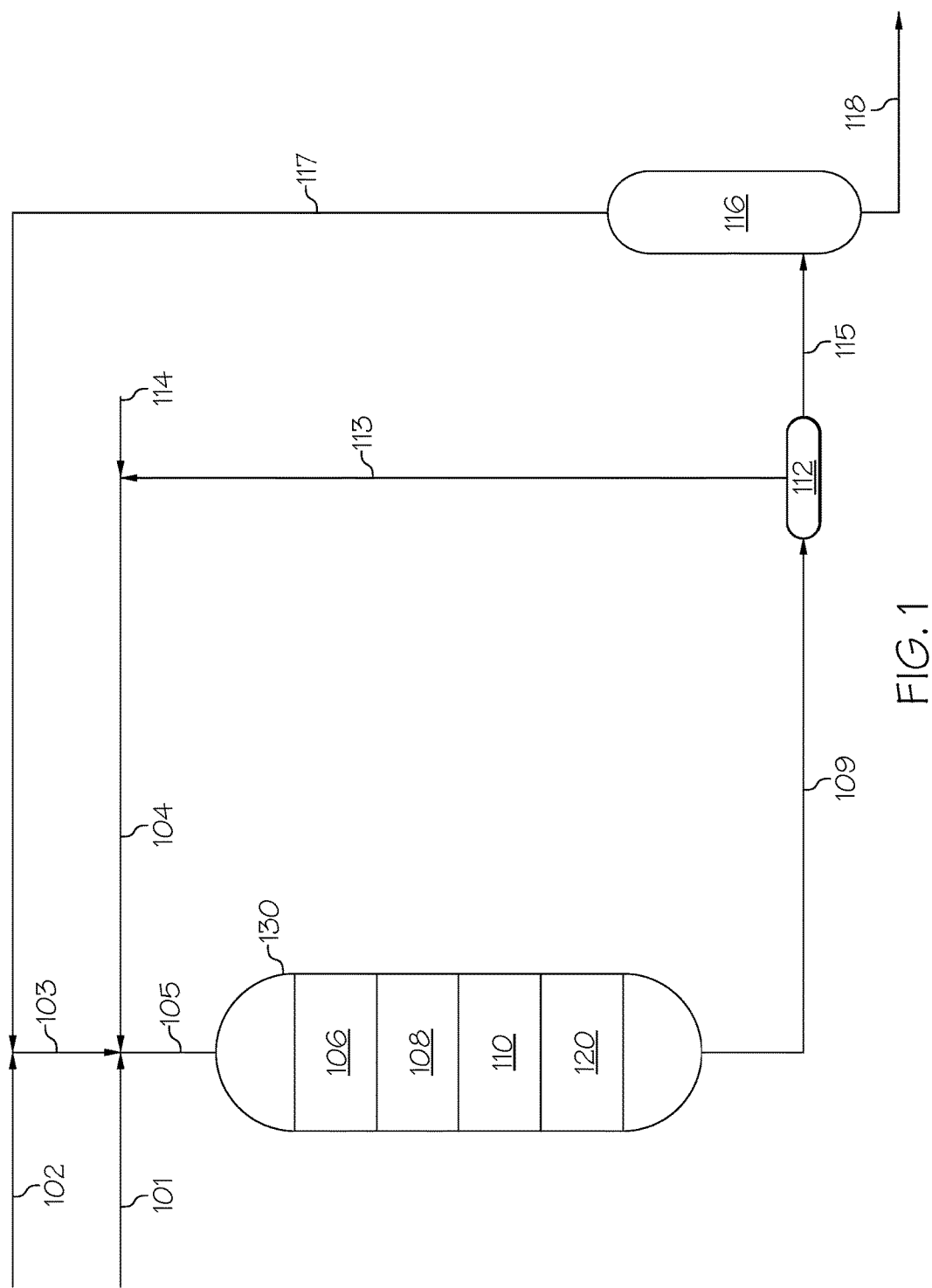
FIG. 1 is a generalized diagram of a chemical pretreatment system which includes a pretreatment reactor comprising a hydrodemetalization (HDM) catalyst, a transition catalyst, a hydrodesulfurization (HDS)/hydrodenitrogenation (HDN) catalyst, and a hydrocracking catalyst, according to one or more embodiments described in this disclosure.

It should further be noted that arrows in the drawings refer to process streams. However, the arrows may equivalently refer to transfer lines which may serve to transfer process steams between two or more system components. Additionally, arrows that connect to system components define inlets or outlets in each given system component. The arrow direction corresponds generally with the major direction of movement of the materials of the stream contained within the physical transfer line signified by the arrow. Furthermore, arrows which do not connect two or more system components signify a product stream which exits the depicted system or a system inlet stream which enters the depicted system. Product streams may be further processed in accompanying chemical processing systems or may be commercialized as end products. System inlet streams may be streams transferred from accompanying chemical processing systems or may be non-processed feedstock streams.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Generally described in this disclosure are embodiments of mesoporous zeolites such as mesoporous zeolite Y materials that may be incorporated into hydrotreating catalysts, such as hydrocracking catalyst. In some embodiments, the hydrotreating catalysts may be utilized to crack aromatics in heavy oils in a pretreatment process prior to steam cracking or other cracking methods. The present disclosure also relates to the methods for producing such mesoporous zeolites as well as the properties and structure of the produced mesoporous zeolites. According to one or more embodiments, a zeolite Y composition may comprise mesoporosity. Such zeolite materials may be referred to throughout this disclosure as "mesoporous zeolite." As used throughout this disclosure, "zeolites" refer to micropore-containing inorganic materials with regular intra-crystalline cavities and channels of molecular dimension. The microporous structure of zeolites (for example, 0.3 nm to 1 nm pore size) may render large surface areas and desirable size-/shape-selectivity, which may be advantageous for catalysis. The mesoporous zeolites described may include aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of less than or equal to 2 nm and greater than or equal to 0.1 nm, and mesopores refer to pores in a structure that have a diameter of greater than 2 nm and less than or equal to 100 nm, or in some embodiments less than or equal to 50 nm. The zeolites presently described, according to one or more embodiments, may be characterized as zeolite Y (that is, having an aluminosilicate FAU framework type).

As used in this disclosure, a "reactor" refers to a vessel in which one or more chemical reactions may occur between one or more reactants optionally in the presence of one or more catalysts. For example, a reactor may include a tank or tubular reactor configured to operate as a batch reactor, a continuous stirred-tank reactor (CSTR), or a plug flow reactor. Example reactors include packed bed reactors such as fixed bed reactors, and fluidized bed reactors. One or more "reaction zones" may be disposed in a reactor. As used in this disclosure, a "reaction zone" refers to an area where a particular reaction takes place in a reactor. For example, a packed bed reactor with multiple catalyst beds may have multiple reaction zones, where each reaction zone is defined by the area of each catalyst bed.

As used in this disclosure, a "separation unit" refers to any separation device or series of separation devices that at least partially separates one or more chemicals that are mixed in a process stream from one another. For example, a separation unit may selectively separate different chemical species from one another, forming one or more chemical fractions. Examples of separation units include, without limitation, distillation columns, flash drums, knock-out drums, knock-out pots, centrifuges, filtration devices, traps, scrubbers, expansion devices, membranes, solvent extraction devices, and the like. It should be understood that separation processes described in this disclosure may not completely separate all of one chemical consistent from all of another chemical constituent. It should be understood that the separation processes described in this disclosure "at least partially" separate different chemical components from one another, and that even if not explicitly stated, it should be understood that separation may include only partial separation. As used in this disclosure, one or more chemical constituents may be "separated" from a process stream to form a new process stream. Generally, a process stream may enter a separation unit and be divided, or separated, into two or more process streams of desired composition. Further, in some separation processes, a "light fraction" and a "heavy fraction" may exit the separation unit, where, in general, the light fraction stream has a lesser boiling point than the heavy fraction stream.

It should be understood that a "reaction effluent" generally refers to a stream that exits a separation unit, a reactor, or reaction zone following a particular reaction or separation, and generally has a different composition than the stream that entered the separation unit, reactor, or reaction zone.

As used in this disclosure, a "catalyst" refers to any substance which increases the rate of a specific chemical reaction. Catalysts described in this disclosure may be utilized to promote various reactions, such as, but not limited to, hydrodemetalization, hydrodesulfurization, hydrodenitrogenation, aromatic cracking, or combinations thereof. As used in this disclosure, "cracking" generally refers to a chemical reaction where a molecule having carbon to carbon bonds is broken into more than one molecule by the breaking of one or more of the carbon to carbon bonds, or is converted from a compound which includes a cyclic moiety, such as an aromatic, to a compound which does not include a cyclic moiety, or a chemical reaction where an aromatic moiety is at least partially saturated.

Figure 2:
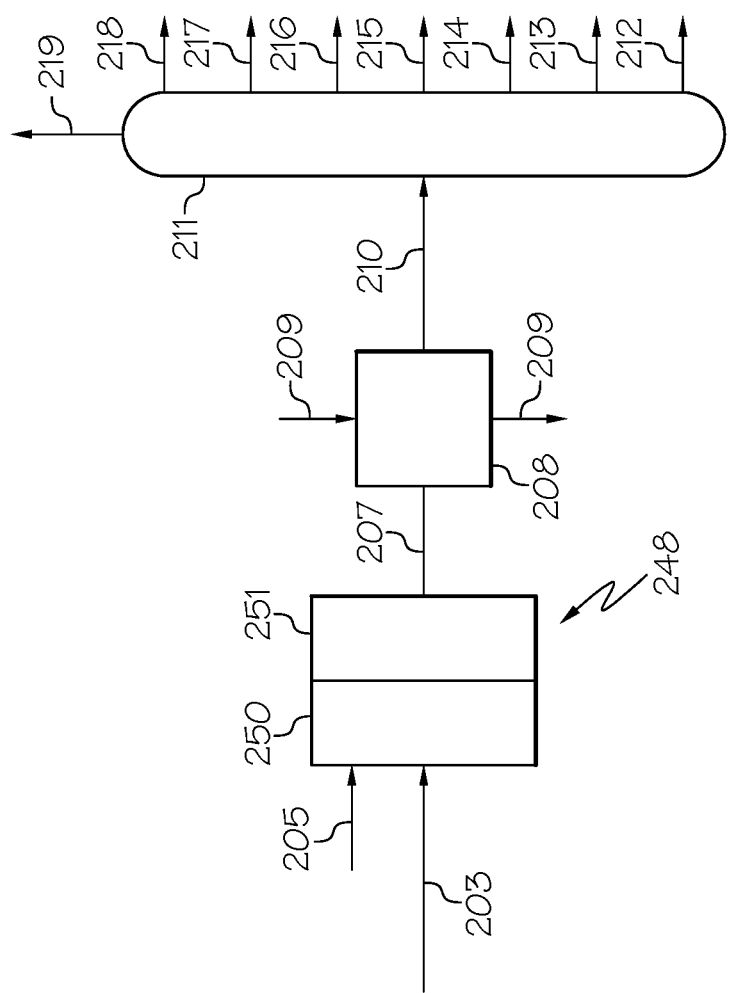
FIG. 2 is a generalized diagram of a chemical processing system utilized subsequent to the chemical pretreatment system of FIG. 1 which includes a steam cracking unit, according to one or more embodiments described in this disclosure; and For the purpose of the simplified schematic illustrations and descriptions of FIGS. 1 and 2, the numerous valves, temperature sensors, electronic controllers and the like that may be employed and well known to those of ordinary skill in the art of certain chemical processing operations are not included. Further, accompanying components that are often included in conventional chemical processing operations, such as refineries, such as, for example, air supplies, catalyst hoppers, and flue gas handling are not depicted. It would be known that these components are within the spirit and scope of the present embodiments disclosed. However, operational components, such as those described in the present disclosure, may be added to the embodiments described in this disclosure.

It should be understood that two or more process stream are "mixed" or "combined" when two or more lines intersect in the schematic flow diagrams of FIGS. 1 and 2. Mixing or combining may also include mixing by directly introducing both streams into a like reactor, separation device, or other system component.

It should be understood that the reactions that are performed by the catalysts as described in this disclosure may remove a chemical constituent, such as only a portion of a chemical constituent, from a process stream. For example, a hydrodemetalization (HDM) catalyst may remove a portion of one or more metals from a process stream, a hydrodenitrogenation (HDN) catalyst may remove a portion of the nitrogen present in a process stream, and a hydrodesulfurization (HDS) catalyst may remove a portion of the sulfur present in a process stream. Additionally, a hydrocracking catalyst, such on one with hydrodearomatization (HDA) functionality may reduce the amount of aromatic moieties in a process stream by cracking (including saturating) those aromatic moieties. It should be understood that, throughout this disclosure, a particular catalyst is not necessarily limited in functionality to the removal or cracking of a particular chemical constituent or moiety when it is referred to as having a particular functionality. For example, a catalyst identified in this disclosure as an HDN catalyst may additionally provide hydrocracking functionality, HDA functionality, HDS functionality, or combinations thereof.

It should further be understood that streams may be named for the components of the stream, and the component for which the stream is named may be the major component of the stream (such as comprising from 50 wt. %, from 70 wt. %, from 90 wt. %, from 95 wt. %, or even from 95 wt. % of the contents of the stream to 100 wt. % of the contents of the stream).

According to embodiments, the mesoporous zeolite Y may be characterized as mesoporous by having average pore size of from 2 nm to 50 nm. By way of comparison, conventional zeolites that may be utilized in hydrocracking catalysts may contain zeolites which are microporous, meaning that they have an average pore size of less than 2 nm. According to one or more embodiments, the mesoporous zeolite Y presently disclosed may have an average pore size of from 2 nm to 25 nm, from 2 nm to 20 nm, from 2 nm to 15, from 2 nm to 10 nm, or from 2 nm to 5 nm. In additional embodiments, at least 30% of the pore volume may be characterized as mesoporous (i.e., at least 30% of the total pore volume has a prove size of at least 2 nm). In additional embodiments, at least 35%, 40%, 45%, 50%, 60%, or even 70% of the pore volume may be characterized as mesoporous.

In additional embodiments, the mesoporous zeolite Y may have a pore volume of from 0.5 to 1.2 mL/g. For example, embodiments of the mesoporous zeolite Y may have a pore volume of from 0.5 to 0.6 mL/g, from 0.5 to 0.7 mL/g, from 0.5 to 0.8 mL/g, from 0.5 to 0.9 mL/g, from 0.5 to 1.0 mL/g, from 0.5 mL/g to 1.1 mL/g, from 0.6 mL/g to 1.2 mL/g, from 0.7 mL/g to 1.2 mL/g, from 0.8 mL/g to 1.2 mL/g, from 0.9 mL/g to 1.2 mL/g, from 1.0 mL/g to 1.2 mL/g, or from 1.1 mL/g to 1.2 mL/g. As used in this disclosure, "pore volume" refers to the total pore volume measured.

In additional embodiments, the mesoporous zeolite Y may have a surface area of from 500 $m^2/g$ to 900 $m^2/g$. For example, embodiments of the mesoporous zeolite Y may have a surface area of from 500 $m^2/g$ to 550 $m^2/g$, from 500 $m^2/g$ to 600 $m^2/g$, from 500 $m^2/g$ to 650 $m^2/g$, from 500 $m^2/g$ to 700 $m^2/g$, from 500 $m^2/g$ to 750 $m^2/g$, from 500 $m^2/g$ to 800 $m^2/g$, from 500 $m^2/g$ to 850 $m^2/g$, from 550 $m^2/g$ to 900 $m^2/g$, from 600 $m^2/g$ to 900 $m^2/g$, from 650 $m^2/g$ to 900 $m^2/g$, from 700 $m^2/g$ to 900 $m^2/g$, from 750 $m^2/g$ to 900 $m^2/g$, from 800 $m^2/g$ to 900 $m^2/g$, or from 850 $m^2/g$ to 900 $m^2/g$.

In additional embodiments, the mesoporous zeolite may have a crystallinity of at least 90%, at least 92%, at least 94%, at least 96%, at least 98%, or even at least 99% of the crystallinity of the initial zeolite material from which the mesoporous zeolite may be formed. Greater crystallinity may impart increased stability to the zeolite, especially when exposed to elevated temperatures such as those in heavy oil pretreatment or other catalytic processes. The crystallinity may be measured with XRD (X-ray Diffraction). A commercialized and relatively well crystallized NaY zeolite (for example, CBV-100 from Zeolyst) may be taken as the reference at 100% crystallinity. From XRD spectra, the five most intensive peaks are integrated. The sample relative crystallinity is calculated based on the following equation: $X\ (\%) = 100\% \times \Sigma A / \Sigma A_0$, where A is the sum of the five peak total area of the fabricated samples; $A_0$ is the sum of the five peak total area of the reference sample (for example, CBV-100). Without being bound by theory, it is believed that hydrothermal treatment or a combination of hydrothermal treatment and acid leaching for pore formation may deteriorate the crystallinity of the zeolite. For example, hydrothermal treatment of zeolite samples may result in the crystallinity being generally less than 90% with respect to the starting zeolite.

Without being bound they theory, it is believed that the relatively large pore size (that is, the mesoporosity) of the presently described mesoporous zeolites and hydrocracking catalysts that include the mesoporous zeolites allows for larger molecules to diffuse inside the zeolite, which is believed to enhance the reaction activity and selectivity of the catalyst. With the increased pore size, aromatic containing molecules can more easily diffuse into the catalyst and aromatic cracking may be increased. For example, in some conventional embodiments, the feedstock converted by the hydroprocessing catalysts may be vacuum gas oils, light cycle oils from, for example, a fluid catalytic cracking reactor, or coker gas oils from, for example, a coking unit. The molecular sizes in these oils are relatively small relative to those of heavy oils such as crude oil and atmosphere residue, which may be the feedstock of the present methods and systems. The heavy oils generally may not be able to diffuse inside the conventional zeolites and be converted on the active sites located inside the zeolites. Therefore, zeolites with larger pore sizes (that is, for example, mesoporous zeolites) may allow for the larger molecules of heavy oils to overcome the diffusion limitation, and may make possible reaction and conversion of the larger molecules of the heavy oils.

The presently described mesoporous zeolite material may be produced by a process which comprises contacting a zeolite (e.g., a zeolite that does not include mesoporosity) with ammonium hexafluorosilicate, $(NH_4)_2SiF_6$, to modify the framework of the zeolite. Following the framework modification step, mesopores may be introduced into the structure-modified zeolite by further processes such as hydrothermal treatment, contact with a base, contact with an acid, or any combination of these. Additional processing steps may include ion exchange of the zeolite prior to framework modification and/or separation of the formed mesoporous zeolite from other substances by processes such as washing, drying, calcining, etc.

According to one or more embodiments, a zeolite, such as zeolite Y comprising sodium (that is, a NaY zeolite), may be ion-exchanged. For example, the zeolite may be $NH_4^+$ ion-exchanged with an ion-exchange agent, such as $NH_4NO_3$. The ion-exchange may be performed at an elevated temperature for a heating period, such as at 90° C. (e.g., 70° C. to 110° C., or from 80° C. to 100° C.) for 1 hour (e.g., 30 min. to 90 min. or 45 min. to 75 min.). The ion-exchange process may produce a zeolite comprising sodium and ammonium (that is, a $NH_4NaY$ zeolite), where $Na_2O$ content may be from 2 wt. % to 4 wt. %. Prior to ion-exchange, the NaY zeolite may contain from 10 wt. % to 15 wt. % sodium oxide. Following ion-exchange, the sodium oxide content may be from 1 wt. % to 5 wt. %. In some embodiments, the ion-exchange may replace sodium molecules with ammonium molecules. In additional alternative embodiments, a zeolite which comprises Na and $NH_4$ may be directly supplied and no ion-exchange step may be necessary.

According to one or more embodiments, following the ion-exchange step, if utilized, the zeolite (for example, $NH_4NaY$ zeolite) may be contacted by ammonium hexafluorosilicate $((NH_4)_2SiF_6)$. In some embodiments, the ammonium hexafluorosilicate may be in an aqueous solution. In additional embodiments, the zeolite may be combined with water and heated. For example, deionized water may be added to a $NH_4NaY$ zeolite and this mixture may be heated to an elevated temperature such as 80-95° C. Under stirring, an $(NH_4)_2SiF_6$ aqueous solution may be combined, for example, drop-wise, with the $NH_4NaY$ zeolite in the deionized water. In one or more embodiments, the $(NH_4)_2SiF_6$ aqueous solution may have a concentration of from 0.2 to 2 M. This slurry may be maintained at an elevated temperature such as 80-95° C. for a heating period such as 1-3 hours.

The ammonium hexafluorosilicate may modify the framework structure of the zeolite, forming a framework-modified zeolite material. Without being bound by theory, it is believed that the ammonium hexafluorosilicate affects the zeolite structure in several ways. For example, it is believed that the the $NH_4^+$ and $SiF_6^-$ of the aqueous solution may simultaneously remove the Al and the Na cations from the framework. Therefore, in some embodiments, no further $NH_4^+$ ion-exchange is required to lower sodium content to meet any specified hydrocracking catalyst specification. It is believed that the Na cations, the Al cations, or both, are removed from the zeolite as $Na_3AlF_6$. Additionally, and still without being bound by theory, it is believed that the Si in $SiF_6^-$ can be inserted back into the vacancy left by Al removal. Therefore, it is believed that a very high crystallinity can be obtained (even up to 110% relative crystallinity). Additionally, it is believed that the Al can be uniformly removed from the zeolite by the use of ammonium hexafluorosilicate as compared with other compounds. For example, a hydrothermal treatment may, in some embodiments, remove the frame-work Al from a zeolite. However, hydrothermal treatment may have poor selectivity to evenly remove the Al, resulting in non-uniformity of the mesopores. Such hydrothermal treatments may also result in relatively low crystallinity. The mesopores of the meso-porous zeolites described herein may be relatively uniform as observed with TEM (transmission electron microscopy). According to embodiments, the treatment by ammonium hexafluorosilicate may change the $SiO_2/Al_2O_3$ molar ratio from 4-6 to 6-20.

According to one or more embodiments, the solids and liquids of the slurry containing the framework-modified zeolite may then be at least partially separated, such as by decanting. The top zeolite may be washed with a solvent, such as deionized water. The cake following the decanting may optionally be $NH_4^+$ ion-exchanged with an ion-exchange agent, such as $NH_4NO_3$ at an elevated temperature for a heating period, such as at 90° C. for 1 hour. The ion-exchanged cake may then optionally be processed by hydrothermal treatment, such as under 500-600° C., 0.1-0.3 MPa steam pressure for 1-3 hours.

The framework modified zeolite may then be processed to form mesopores. In one or more embodiments, the framework zeolite material may then be combined with one or more of a base or a surfactant. For example, a base aqueous solution (for example, NaOH, KOH, or ammonium hydroxide) and cetrimonium bromide can be combined with the framework modified zeolite, forming a mixture. For example, a base aqueous solution may be added to the mixture containing the zeolite material, and then cetrimonium bromide may be subsequently added. In one or more embodiments, the base aqueous solution concentration may be from 0.05 M to 2 M, and the weight ratio of cetrimonium bromide to zeolite may be from 0.1 to 1.5. This second mixture may then be heated to an elevated temperature for a heating time period to form mesopores in the zeolite material. For example, the elevated temperature may be from 100° C. to 150° C. and the heating time period may be from 1 to 5 days. The zeolite material may then be separated from the other contents of the mixture. According to one or more embodiments, the separation may comprise a solids/liquids separation technique (e.g., centrifugation, filtering, etc.), followed by washing with water, drying at, for example 100° C. for a period of several hours, and then calcination by exposure to temperatures of at least 400° C., such as 500° C. to 600° C., for several hours, such as 3 hours to 6 hours.

According to one or more embodiments, the mesoporous zeolite presently disclosed may be incorporated into a catalyst. The catalyst may be utilized as a hydrocracking catalyst in the pretreatment of heavy oils, as described subsequently in detail. As such, the catalyst which includes the mesoporous zeolite is referred to herein as the "hydrocracking catalyst." However, it should be understood that, while the hydrocracking catalyst is described in the context of pretreatment (e.g., hydrotreatment) of a heavy oil, the hydrocracking catalyst described herein may be useful for other catalytic reactions for other process fuels.

In one or more embodiments, the hydrocracking catalyst may comprise the presently described mesoporous zeolite, one or more metal oxide support materials, and one or more metal catalysts. The hydrocracking catalysts presently described may have a material composition comprising from 10 wt. % to 80 wt. % of one or more metal oxide support materials (for example, alumina), from 18 wt. % to 32 wt. % of metal catalyst material, and from 10 wt. % to 60 wt. % of the mesoporous zeolite.

The metal catalyst material may comprise one or more metals from IUPAC Groups 5, 6, 8, 9, or 10 of the periodic table. For example, the hydrocracking catalyst may comprise one or more metals from IUPAC Groups 5 or 6, and one or more metals from IUPAC Groups 8, 9, or 10 of the periodic table. For example, the hydrocracking catalyst may comprise molybdenum or tungsten from IUPAC Group 6 and nickel or cobalt from IUPAC Groups 8, 9, or 10. In one or more embodiments, the hydrocracking catalyst may comprise tungsten and nickel metal catalyst. In another embodiment, the hydrocracking catalyst may comprise molybdenum and nickel metal catalyst. For example, in one or more embodiments, the hydrocracking catalyst may comprise from 20 wt. % to 26 wt. % of a sulfide or oxide of tungsten, from 4 wt. % to 6 wt. % of an oxide or sulfide of nickel, from 10 wt. % to 70 wt. % of a metal oxide support material such as alumina, and from 10 wt. % to 60 wt. % of mesoporous zeolite Y. In another embodiment, the hydrocracking catalyst may comprise from 14 wt. % to 16 wt. % of an oxide or sulfide of molybdenum, from 4 wt. % to 6 wt. % of an oxide or sulfide of nickel, from 20 wt. % to 80 wt. % of a metal oxide support material such as alumina, and from 10 wt. % to 60 wt. % of mesoporous zeolite Y.

The hydrocracking catalysts described may be fabricated by providing the mesoporous zeolite and impregnating the mesoporous zeolite with one or more catalytic metals or by comulling mesoporous zeolite with other components. In one or more embodiments, the mesoporous zeolite, active alumina (for example, boehmite alumina), and binder (for example, acid peptized alumina) may be mixed. An appropriate amount of water may be added to form a dough that can be extruded using an extruder. The extrudate may be dried at 80° C. to 120° C. for 4 hours to 10 hours, and then calcinated at 500° C. to 550° C. for 4 hours to 6 hours. To this alumina support material which includes the mesoporous zeolite may then be added the metal catalyst material such as oxide or sulfides of Mo, Ni, W, or Ni. For example, in one or more embodiments, the support material may be impregnated with one or more metals to form hydrocracking catalyst. According to described embodiments, the impregnation of the support material may comprise contacting the support material with a solution comprising one or more metal catalyst precursors. For example, the support material may be submerged in the solution comprising the one or more metal catalyst precursors, an impregnation method sometimes referred to as a saturated impregnation. In embodiments of saturated impregnation, the support may be submerged in an amount of solution comprising the metal catalyst precursors 2 to 4 times of that which is absorbed by the support, and the remaining solution is subsequently removed. According to another embodiment, the impregnation may be by incipient wetness impregnation, sometimes referred to as capillary impregnation or dry impregnation. In embodiments of incipient wetness impregnation, the metal catalyst precursor containing solution is contacted with the support, where the amount of solution is approximately equal to the pore volume of the support and capillary action may draw the solution into the pores. After the contacting of the support material with the solution, the support material may be calcined at a temperature of at least 500° C. (such as from 500° C. to 600° C.) for a time of at least 3 hours (such as 3 hours to 6 hours). For example, the calcining may be at a temperature of 500° C. for 4 hours. Generally, the impregnation process will allow for attachment of the metal catalyst onto the support materials (that is, the zeolite and metal oxide support). The metal catalyst precursors may include one or more of Ni, W, Mo, Co, and following the impregnation, are present on the catalyst support as compounds comprising Ni, W, Mo, Co, or combinations thereof. Two or more metal catalyst precursors may be utilized when two metal catalysts are desired. However, some embodiments may include only one of Ni, W, Mo, or Co. For example, the catalyst support material may be impregnated by a mixture of nickel nitrate hexahydrate (that is, $Ni(NO_3)_2 \cdot 6H_2O$) and ammonium metatungstate (that is, $(NH_4)_6H_2W_{12}O_{40}$) if a W—Ni catalyst is desired. While it should be understood that the scope of the present disclosure should not be limited by the metal catalyst precursor selected, other suitable metal catalyst precursors may include cobalt nitrate hexahydrate ($Co(NO_3)_2 \cdot 6H2O$), ammonia heptamolybdate ($(NH_4)_6Mo_7O_{24} \cdot 4H_2O$), or ammonium molybdate ($(NH_4)_2MoO_4$). Following impregnation, the impregnated metal catalysts may be present as a metal oxide, such as $WO_3$, $MoO_3$, $NiO$, and $CoO$, and are referred to in this disclosure as "metal catalyst materials." While these metal catalyst materials may include metal oxides, it should be appreciated that the metal catalyst materials are distinct from the metal oxide support material of the catalyst which may, in some embodiments, be alumina.

As described herein, the mesoporous zeolite may be utilized as a hydrocracking catalyst in the upgrading processing of heavy oils, such as crude oils. Such upgrading processes may be a pretreatment step prior to other petrochemical processing such as refining operations utilizing one or more of hydrocracking and fluid catalytic cracking. Generally, the upgrading process may remove one or more of at least a portion of nitrogen, sulfur, and one or more metals from the heavy oil, and may additionally break aromatic moieties in the heavy oil. According to one or more embodiments, the heavy oil may be treated with a hydrodemetalization catalyst (referred to sometimes in this disclosure as an "HDM catalyst"), a transition catalyst, a hydrodenitrogenation catalyst (referred to sometimes in this disclosure as an "HDN catalyst"), and a hydrocracking catalyst. The HDM catalyst, transition catalyst, HDN catalyst, and hydrocracking catalyst may be positioned in series, either contained in a single reactor, such as a packed bed reactor with multiple beds, or contained in two or more reactors arranged in series.

Referring now to FIG. 1, a pretreatment system is schematically depicted which includes one or more of an HDM reaction zone 106, a transition reaction zone 108, a HDN reaction zone 110, and a hydrocracking reaction zone 120. According to embodiments of this disclosure, a heavy oil feed stream 101 may be mixed with a hydrogen stream 104. The hydrogen stream 104 may comprise unspent hydrogen gas from recycled process gas component stream 113, make-up hydrogen from hydrogen feed stream 114, or both, to form a pretreatment catalyst input stream 105. In one or more embodiments, pretreatment catalyst input stream 105 may be heated to a process temperature of from 350 degrees Celsius (° C.) to 450° C. The pretreatment catalyst input stream 105 may enter and pass through a series of reaction zones, including the HDM reaction zone 106, the transition reaction zone 108, the HDN reaction zone 110, and a hydrocracking reaction zone 120. The HDM reaction zone 106 comprises an HDM catalyst, the transition reaction zone 108 comprises a transition catalyst, the HDN reaction zone 110 comprises an HDN catalyst, and a hydrocracking reaction zone 120 comprises the hydrocracking catalyst comprising the mesoporous zeolite.

The systems and processes described are applicable for a wide variety of heavy oil feeds (in heavy oil feed stream 101), including crude oils, vacuum residue, tar sands, bitumen and vacuum gas oils using a catalytic hydrotreating pretreatment process. For example, when the heavy oil feed is crude oil, it may have an American Petroleum Institute (API) gravity of greater than or equal to 25 degrees, such as from 25 degrees to 50 degrees, from 25 degrees to 30 degrees, from 30 degrees to 35 degrees, from 35 degrees to 40 degrees, from 40 degrees to 45 degrees, from 45 degrees to 50 degrees, or any combination of these ranges. For example, the heavy oil feed utilized may be Arab heavy crude oil or Arab light crude oil. By way of example, the typical properties for an Arab heavy crude oil are shown in Table 1.

TABLE 1A

Arab Heavy Export Feedstock

| Analysis | Units | Value |
|---|---|---|
| American Petroleum Institute (API) gravity | degree | 27 |
| Density | grams per cubic centimeter ($g/cm^3$) | 0.8904 |
| Sulfur Content | Weight percent (wt. %) | 2.83 |
| Nickel | Parts per million by weight (ppmw) | 16.4 |
| Vanadium | ppmw | 56.4 |
| NaCl Content | ppmw | <5 |
| Conradson Carbon | wt. % | 8.2 |
| C5 Asphaltenes | wt. % | 7.8 |
| C7 Asphaltenes | wt. % | 4.2 |

TABLE 1B

Arab Light Export Feedstock

| Density, g/ml (20° C.) | 0.8595 |
|---|---|
| API | 33.13 |
| C, wt. % | 85.29 |
| H, wt. % | 12.68 |
| S, wppm | 19400 |
| N, wppm | 849 |
| Asphaltenes, wt. % | 1.2 |
| Micro carbon residue, wt. % | 3.4 |
| V, ppm | 15 |
| Ni, ppm | 12 |
| As, ppm | 0.04 |
| Hg, ppm | <2 |
| Boiling Point Properties | |
| Initial Boiling Point/5 wt. % | 33° C./92° C. |
| 10 wt. %/20 wt. % | 133° C./192° C. |
| 30 wt. %/40 wt. % | 251° C./310° C. |
| 50 wt. %/60 wt. % | 369° C./432° C. |
| 70 wt. %/80 wt. % | 503° C./592° C. |
| 90 wt. %/95 wt. % | >720° C./>720° C. |
| End Boiling Point | >720° C. |
| Narrow fraction yield, wt. % | |
| C5-180° C. | 18 wt. % |
| 180-350° C. | 28.8 wt. % |
| 350-540° C. | 27.4 wt. % |
| >540° C. | 25.8 wt. % |

Referring still to FIG. 1, pretreatment catalyst input stream 105 may be introduced to pretreatment reactor 130. According to one or more embodiments, the pretreatment reactor 130 may comprise multiple reactions zones arranged in series (for example, the HDM reaction zone 106, the transition reaction zone 108, the HDN reaction zone 110, and a hydrocracking reaction zone 120) and each of these reaction zones may comprise a catalyst bed. In such an embodiment, the pretreatment reactor 130 comprises an HDM catalyst bed comprising an HDM catalyst in the HDM reaction zone 106, a transition catalyst bed comprising a transition catalyst in the transition reaction zone 108, an HDN catalyst bed comprising an HDN catalyst in the HDN reaction zone 110, and a hydrocracking catalyst bed comprising a hydrocracking catalyst in the hydrocracking reaction zone 120.

According to one or more embodiments, the pretreatment catalyst input stream 105, which comprises heavy oil, is introduced to the HDM reaction zone 106 and is contacted by the HDM catalyst. Contact by the HDM catalyst with the pretreatment catalyst input stream 105 may remove at least a portion of the metals present in the pretreatment catalyst input stream 105. Following contact with the HDM catalyst, the pretreatment catalyst input stream 105 may be converted to an HDM reaction effluent. The HDM reaction effluent may have a reduced metal content as compared to the contents of the pretreatment catalyst input stream 105. For example, the HDM reaction effluent may have at least 70 wt. % less, at least 80 wt. % less, or even at least 90 wt. % less metal as the pretreatment catalyst input stream 105.

According to one or more embodiments, the HDM reaction zone 106 may have a weighted average bed temperature of from 350° C. to 450° C., such as from 370° C. to 415° C., and may have a pressure of from 30 bars to 200 bars, such as from 90 bars to 110 bars. The HDM reaction zone 106 comprises the HDM catalyst, and the HDM catalyst may fill the entirety of the HDM reaction zone 106.

The HDM catalyst may comprise one or more metals from the International Union of Pure and Applied Chemistry (IUPAC) Groups 5, 6, or 8-10 of the periodic table. For example, the HDM catalyst may comprise molybdenum. The HDM catalyst may further comprise a support material, and the metal may be disposed on the support material. In one or more embodiments, the HDM catalyst may comprise a molybdenum metal catalyst on an alumina support (sometimes referred to as "Mo/$Al_2O_3$ catalyst"). It should be understood throughout this disclosure that metals that are contained in any of the disclosed catalysts may be present as sulfides or oxides, or even other compounds.

In one or more embodiments, the HDM catalyst may include a metal sulfide on a support material, where the metal is selected from the group consisting of IUPAC Groups 5, 6, and 8-10 elements of the periodic table, and combinations thereof. The support material may be gamma-alumina or silica/alumina extrudates, spheres, cylinders, beads, pellets, and combinations thereof.

In one or more embodiments, the HDM catalyst may comprise a gamma-alumina support, with a surface area of from 100 $m^2/g$ to 160 $m^2/g$ (such as, from 100 $m^2/g$ to 130 $m^2/g$, or form 130 $m^2/g$ to 160 $m^2/g$). The HDM catalyst can be best described as having a relatively large pore volume, such as at least 0.8 $cm^3/g$ (for example, at least 0.9 $cm^3/g$, or even at least 1.0 $cm^3/g$. The pore size of the HDM catalyst may be predominantly macroporous (that is, having a pore size of greater than 50 nm). This may provide a large capacity for the uptake of metals on the HDM catalyst's surface and optionally dopants. In one or more embodiments, a dopant can be selected from the group consisting of boron, silicon, halogens, phosphorus, and combinations thereof.

In one or more embodiments, the HDM catalyst may comprise from 0.5 wt. % to 12 wt. % of an oxide or sulfide of molybdenum (such as from 2 wt. % to 10 wt. % or from 3 wt. % to 7 wt. % of an oxide or sulfide of molybdenum), and from 88 wt. % to 99.5 wt. % of alumina (such as from 90 wt. % to 98 wt. % or from 93 wt. % to 97 wt. % of alumina).

Without being bound by theory, in some embodiments, it is believe that during the reaction in the HDM reaction zone 106, porphyrin type compounds present in the heavy oil are first hydrogenated by the catalyst using hydrogen to create an intermediate. Following this primary hydrogenation, the nickel or vanadium present in the center of the porphyrin molecule is reduced with hydrogen and then further reduced to the corresponding sulfide with hydrogen sulfide ($H_2S$). The final metal sulfide is deposited on the catalyst thus removing the metal sulfide from the virgin crude oil. Sulfur is also removed from sulfur containing organic compounds. This is performed through a parallel pathway. The rates of these parallel reactions may depend upon the sulfur species being considered. Overall, hydrogen is used to abstract the sulfur which is converted to $H_2S$ in the process. The remaining, sulfur-free hydrocarbon fragment remains in the liquid hydrocarbon stream.

The HDM reaction effluent may be passed from the HDM reaction zone 106 to the transition reaction zone 108 where it is contacted by the transition catalyst. Contact by the transition catalyst with the HDM reaction effluent may remove at least a portion of the metals present in the HDM reaction effluent stream as well as may remove at least a portion of the nitrogen present in the HDM reaction effluent stream. Following contact with the transition catalyst, the HDM reaction effluent is converted to a transition reaction effluent. The transition reaction effluent may have a reduced metal content and nitrogen content as compared to the HDM reaction effluent. For example, the transition reaction effluent may have at least 1 wt. % less, at least 3 wt. % less, or even at least 5 wt. % less metal content as the HDM reaction effluent. Additionally, the transition reaction effluent may have at least 10 wt. % less, at least 15 wt. % less, or even at least 20 wt. % less nitrogen as the HDM reaction effluent.

According to embodiments, the transition reaction zone 108 has a weighted average bed temperature of about 370° C. to 410° C. The transition reaction zone 108 comprises the transition catalyst, and the transition catalyst may fill the entirety of the transition reaction zone 108.

In one or more embodiments, the transition reaction zone 108 may be operable to remove a quantity of metal components and a quantity of sulfur components from the HDM reaction effluent stream. The transition catalyst may comprise an alumina based support in the form of extrudates.

In one or more embodiments, the transition catalyst comprises one metal from IUPAC Group 6 and one metal from IUPAC Groups 8-10. Example IUPAC Group 6 metals include molybdenum and tungsten. Example IUPAC Group 8-10 metals include nickel and cobalt. For example, the transition catalyst may comprise Mo and Ni on a titania support (sometimes referred to as "Mo—Ni/$Al_2O_3$ catalyst"). The transition catalyst may also contain a dopant that is selected from the group consisting of boron, phosphorus, halogens, silicon, and combinations thereof. The transition catalyst can have a surface area of 140 $m^2/g$ to 200 $m^2/g$ (such as from 140 $m^2/g$ to 170 $m^2/g$ or from 170 $m^2/g$ to 200 $m^2/g$). The transition catalyst can have an intermediate pore volume of from 0.5 $cm^3/g$ to 0.7 $cm^3/g$ (such as 0.6 $cm^3/g$). The transition catalyst may generally comprise a mesoporous structure having pore sizes in the range of 12 nm to 50 nm. These characteristics provide a balanced activity in HDM and HDS.

In one or more embodiments, the transition catalyst may comprise from 10 wt. % to 18 wt. % of an oxide or sulfide of molybdenum (such as from 11 wt. % to 17 wt. % or from 12 wt. % to 16 wt. % of an oxide or sulfide of molybdenum), from 1 wt. % to 7 wt. % of an oxide or sulfide of nickel (such as from 2 wt. % to 6 wt. % or from 3 wt. % to 5 wt. % of an oxide or sulfide of nickel), and from 75 wt. % to 89 wt. % of alumina (such as from 77 wt. % to 87 wt. % or from 79 wt. % to 85 wt. % of alumina).

The transition reaction effluent may be passed from the transition reaction zone 108 to the HDN reaction zone 110 where it is contacted by the HDN catalyst. Contact by the HDN catalyst with the transition reaction effluent may remove at least a portion of the sulfur and nitrogen present in the transition reaction effluent stream. For example, the HDN catalyst may have HDN and HDS functionality. Following contact with the HDN catalyst, the transition reaction effluent may be converted to an HDN reaction effluent. The HDN reaction effluent may have a reduced metal content and nitrogen content as compared to the transition reaction effluent. For example, the HDN reaction effluent may have a nitrogen content reduction of at least 80 wt. %, at least 85 wt. %, or even at least 90 wt. % relative to the transition reaction effluent. In another embodiment, the HDN reaction effluent may have a sulfur content reduction of at least 80 wt. %, at least 90 wt. %, or even at least 95 wt. % relative to the transition reaction effluent. In another embodiment, the HDN reaction effluent may have an aromatics content reduction of at least 25 wt. %, at least 30 wt. %, or even at least 40 wt. % relative to the transition reaction effluent.

According to embodiments, the HDN reaction zone 110 has a weighted average bed temperature of from 370° C. to 410° C. The HDN reaction zone 110 comprises the HDN catalyst, and the HDN catalyst may fill the entirety of the HDN reaction zone 110.

In one or more embodiments, the HDN catalyst includes a metal oxide or sulfide on a support material, where the metal is selected from the group consisting of IUPAC Groups 5, 6, and 8-10 of the periodic table, and combinations thereof. The support material may include gamma-alumina, meso-porous alumina, silica, or both, in the form of extrudates, spheres, cylinders and pellets.

According to one or more embodiments, the HDN catalyst contains a gamma alumina based support that has a surface area of 180 $m^2/g$ to 240 $m^2/g$ (such as from 180 $m^2/g$ to 210 $m^2/g$, or from 210 $m^2/g$ to 240 $m^2/g$). This relatively large surface area for the HDN catalyst allows for a smaller pore volume (for example, less than 1.0 $cm^3/g$, less than 0.95 $cm^3/g$, or even less than 0.9 $cm^3/g$). In one or more embodiments, the HDN catalyst contains at least one metal from IUPAC Group 6, such as molybdenum and at least one metal from IUPAC Groups 8-10, such as nickel. The HDN catalyst can also include at least one dopant selected from the group consisting of boron, phosphorus, silicon, halogens, and combinations thereof. In one or more embodiments, cobalt can be used to increase desulfurization of the HDN catalyst. In one or more embodiments, the HDN catalyst has a higher metals loading for the active phase as compared to the HDM catalyst. This increased metals loading may cause increased catalytic activity. In one or more embodiments, the HDN catalyst comprises nickel and molybdenum, and has a nickel to molybdenum mole ratio (Ni/(Ni+Mo)) of 0.1 to 0.3 (such as from 0.1 to 0.2 or from 0.2 to 0.3). In an embodiment that includes cobalt, the mole ratio of (Co+Ni)/Mo may be in the range of 0.25 to 0.85 (such as from 0.25 to 0.5 or from 0.5 to 0.85).

According to embodiments described, the HDN catalyst may be produced by mixing a support material, such as alumina, with a binder, such as acid peptized alumina. Water or another solvent may be added to the mixture of support material and binder to form an extrudable phase, which is then extruded into a desired shape. The extrudate may be dried at an elevated temperature (such as above 100° C., such as 110° C.) and then calcined at a suitable temperature (such as at a temperature of at least 400° C., at least 450° C., such as 500° C.). The calcined extrudates may be impregnated with an aqueous solution containing catalyst precursor materials, such as precursor materials which include Mo, Ni, or combinations thereof. For example, the aqueous solution may contain ammonium heptanmolybdate, nickel nitrate, and phosphoric acid to form an HDN catalyst comprising compounds comprising molybdenum, nickel, and phosphorous.

According to one or more embodiments, the HDN catalyst may comprise from 10 wt. % to 18 wt. % of an oxide or sulfide of molybdenum (such as from 13 wt. % to 17 wt. % or from 14 wt. % to 16 wt. % of an oxide or sulfide of molybdenum), from 2 wt. % to 8 wt. % of an oxide or sulfide of nickel (such as from 3 wt. % to 7 wt. % or from 4 wt. % to 6 wt. % of an oxide or sulfide of nickel), and from 74 wt. % to 88 wt. % of alumina (such as from 76 wt. % to 84 wt. % or from 78 wt. % to 82 wt. % of alumina).

In a similar manner to the HDM catalyst, and again not intending to be bound to any theory, it is believed that hydrodenitrogenation and hydrodearomatization may operate via related reaction mechanisms. Both involve some degree of hydrogenation. For the hydrodenitrogenation, organic nitrogen compounds are usually in the form of heterocyclic structures, the heteroatom being nitrogen. These heterocyclic structures may be saturated prior to the removal of the heteroatom of nitrogen. Similarly, hydrodearomatization involves the saturation of aromatic rings. Each of these reactions may occur to a differing amount on each of the catalyst types as the catalysts are selective to favor one type of transfer over others and as the transfers are competing.

Still referring to FIG. 1, the HDN reaction effluent may be passed from the HDN reaction zone 110 to the hydrocracking reaction zone 120 where it is contacted by the hydrocracking catalyst, described above. Contact by the hydrocracking catalyst with the HDN reaction effluent may reduce aromatic content present in the HDN reaction effluent. Following contact with the hydrocracking catalyst, the HDN reaction effluent is converted to a pretreatment catalyst reaction effluent stream 109. The pretreatment catalyst reaction effluent stream 109 may have reduced aromatics content as compared to the HDN reaction effluent. For example, the pretreatment catalyst reaction effluent stream 109 may have at least 50 wt. % less, at least 60 wt. % less, or even at least 80 wt. % less aromatics content as the HDN reaction effluent.

According to one or more embodiments described, the volumetric ratio of HDM catalyst:transition catalyst:HDN catalyst:hydrocracking catalyst may be 5-20:5-30:30-70:5-30 (such as a volumetric ratio of 5-15:5-15:50-60:15-20, or approximately 10:10:60: 20.) The ratio of catalysts may depend at least partially on the metal content in the oil feedstock processed.

Still referring to FIG. 1, pretreatment catalyst reaction effluent stream 109 may enter a separation unit 112 and may be separated into recycled process gas component stream 113 and intermediate liquid product stream 115. In one or more embodiments, the pretreatment catalyst reaction effluent stream 109 may also be purified to remove hydrogen sulfide and other process gases to increase the purity of the hydrogen to be recycled in recycled process gas component stream 113. The hydrogen consumed in the process can be compensated for by the addition of a fresh hydrogen from hydrogen feed stream 114, which may be derived from a steam or naphtha reformer or other source. Recycled process gas component stream 113 and fresh make-up hydrogen feed stream 114 may combine to form hydrogen stream 104. In one or more embodiments, intermediate liquid product stream 115 from the process can be flashed in flash vessel 116 to separate light hydrocarbon fraction stream 117 and pretreatment final liquid product stream 118; however, it should be understood that this flashing step is optional. In one or more embodiments, light hydrocarbon fraction stream 117 acts as a recycle and is mixed with fresh light hydrocarbon diluent stream 102 to create light hydrocarbon diluent stream 103. Fresh light hydrocarbon diluent stream 102 can be used to provide make-up diluent to the process as needed in order to help further reduce the deactivation of one or more of the catalysts in the pretreatment reactor 130.

In one or more embodiments, one or more of the pretreatment catalyst reaction effluent stream 109, the intermediate liquid product stream 115, and the pretreatment final liquid product stream 118 may have reduced aromatic content as compared with the heavy oil feed stream 101. Additionally, in embodiments, one or more of the pretreatment catalyst reaction effluent stream 109, the intermediate liquid product stream 115, and the pretreatment final liquid product stream 118 may have significantly reduced sulfur, metal, asphaltenes, Conradson carbon, nitrogen content, or combinations thereof, as well as an increased API and increased diesel and vacuum distillate yields in comparison with the heavy oil feed stream 101.

According to one or more embodiments, the pretreatment catalyst reaction effluent stream 109 may have a reduction of at least about 80 wt. %, a reduction of at least 90 wt. %, or even a reduction of at least 95 wt. % of nitrogen with respect to the heavy oil feed stream 101. According to another embodiment, the pretreatment catalyst reaction effluent stream 109 may have a reduction of at least about 85 wt. %, a reduction of at least 90 wt. %, or even a reduction of at least 99 wt. % of sulfur with respect to the heavy oil feed stream 101. According to another embodiment, the pretreatment catalyst reaction effluent stream 109 may have a reduction of at least about 70 wt. %, a reduction of at least 80 wt. %, or even a reduction of at least 85 wt. % of aromatic content with respect to the heavy oil feed stream 101. According to another embodiment, the pretreatment catalyst reaction effluent stream 109 may have a reduction of at least about 80 wt. %, a reduction of at least 90 wt. %, or even a reduction of at least 99 wt. % of metal with respect to the heavy oil feed stream 101.

Still referring to FIG. 1, in various embodiments, one or more of the pretreatment catalyst reaction effluent stream 109, the intermediate liquid product stream 115, and the pretreatment final liquid product stream 118 may be suitable for use as the upgraded fuel stream 203 of a refining process such as shown in FIG. 2, as described subsequently in this disclosure. As used in this disclosure, one or more of the pretreatment catalyst reaction effluent stream 109, the intermediate liquid product stream 115, and the pretreatment final liquid product stream 118 may be referred to as an "upgraded fuel" which may be downstream processed by refining as described with reference to FIG. 2.

Now referring to FIG. 2, a steam cracking and separation system is depicted. The upgraded fuel stream 203 may be passed to a steam cracker unit 248. The steam cracker unit 248 may include a convection zone 250 and a pyrolysis zone 251. The lesser boiling point fuel fraction stream 203 may pass into the convection zone 250 along with steam 205. In the convection zone 250, the upgraded fuel stream 203 may be pre-heated to a desired temperature, such as from 400° C. to 650° C. The contents of the upgraded fuel stream 203 present in the convection zone 250 may then be passed to the pyrolysis zone 251 where it is steam-cracked. The steam-cracked effluent stream 207 may exit the steam cracker unit 248 and be passed through a heat exchanger 208 where process fluid 209, such as water or pyrolysis fuel oil, cools the steam-cracked effluent stream 207 to form the cooled steam-cracked effluent stream 210. The steam-cracked effluent stream 207 and cooled steam-cracked effluent stream 210 may include a mixture of cracked hydrocarbon-based materials which may be separated into one or more petrochemical products included in one or more system product streams. For example, the steam-cracked effluent stream 207 and the cooled steam-cracked effluent stream 210 may include one or more of fuel oil, gasoline, mixed butenes, butadiene, propene, ethylene, methane, and hydrogen, which may further be mixed with water from the steam cracking.

According to one or more embodiments, the pyrolysis zone 251 may operate at a temperature of from 700° C. to 900° C. The pyrolysis zone 251 may operate with a residence time of from 0.05 seconds to 2 seconds. The mass ratio of steam 205 to upgraded fuel stream 203 may be from about 0.3:1 to about 2:1.

The cooled steam-cracked effluent stream 210 may be separated by separation unit 211 into system product streams. For example, the separation unit 211 may be a distillation column which separates the contents of the cooled steam-cracked effluent stream 210 into one or more of a fuel oil stream 212, a gasoline stream 213, a mixed butenes stream 214, a butadiene stream 215, a propene stream 216, an ethylene stream 217, a methane stream 218, and a hydrogen stream 219. As used in this disclosure, the system product streams (such as the fuel oil stream 212, the gasoline stream 213, the mixed butenes stream 214, the butadiene stream 215, the propene stream 216, the ethylene stream 217, and the methane stream 218) may be referred to as system products, sometimes used as feeds in downstream chemical processing.

According to one or more embodiments, at least about 5 wt. %, 10 wt. %, or even 15 wt. % of the upgraded fuel stream 203 may have a boiling point of 540° C. or greater. In conventional systems, such as those not comprising the hydrocracking catalyst comprising the mesoporous zeolite Y presently described, this 540° C.+ fraction may need to be rejected from the steam cracking process depicted in FIG. 2 because of excessive coke formation and non-smooth operation of the steam cracking. However, with the use of the presently described hydrocracking catalyst comprising the mesoporous zeolite Y presently described, this 540° C.+ fraction may be reduced in wt. % in the upgraded fuel stream 203. Since the 540° C.+ fraction is reduced, steam cracking is more efficient. Without being bound by theory, it is believed that the relatively small particle size and existence of mesopores in the zeolite Y presently described and included in the hydrocracking catalyst may contribute to the better conversion (e.g., aromatic reduction) of the 540° C.+ fraction in the heavy oil feed stream 101 because these relatively large molecules (i.e., the 540° C.+ residues) can access active sites, and thus be converted to light fractions, which are more easily converted by steam cracking, thus producing more light olefins.

EXAMPLES

The various embodiments of methods for producing mesoporous zeolite Y will be further clarified by the following examples. The examples are illustrative in nature, and should not be understood to limit the subject matter of the present disclosure.

Example 1—Synthesis of Presently Disclosed Mesoporous Zeolite Y

NaY zeolite was $NH_4^+$ ion-exchanged with $NH_4NO_3$ (at 90° C. for 1 hour) to produce $NH_4NaY$ zeolite (where Na content was 2-4 wt %). Deionized water was added to the $NH_4NaY$ zeolite and heated to 80-90° C. Under the stirring, an $(NH_4)_2SiF_6$ aqueous solution was drop added in 1-3 hours to the $NH_4NaY$ zeolite in the deionized water to form a slurry. This slurry was maintained at 80-95° C. for 1-2 hours. The slurry was then decanted. The top zeolite was washed two times with deionized water. The cake following the decanting was $NH_4^+$ ion-exchanged with $NH_4NO_3$ (at 90° C. for 1 hour). This ion-exchanged cake was then optionally processed by hydrothermal treatment under 500-600° C., 0.1-0.3 MPa steam pressure for 1-3 hours. NaOH and Cetrimonium bromide (CTAB) were added to the ion-exchanged and optionally hydrothermally treated cake, where the CTAB/zeolite weight ratio was 0.1-1.5. The NaOH concentration was in the range of 0.05-2M. This mixture was stirred at room temperature for 4 to 24 hours. Following stirring, this mixture was transferred into an autoclave and maintained at 100-150° C. for 1-5 days. Following autoclaving, the mixture was separated and washed with purified water three times, and the dried at 100° C. overnight, and calcinated at 500-600° C. for 3-6 hours. To study the effect of different reaction solutions on $(NH_4)_2SiF_6$ solution treatment, the mesoporous zeolite Y was also synthesized under $NH_4NO_3$ aqueous solution and $NH_4Cl$ aqueous solution, respectively.

Example 2—Characterization of the Presently Disclosed Mesoporous Zeolite Y

The mesoporous zeolite Y was synthesized as described in Example 1, and studied in lab. The main properties of the zeolites were characterized by BET, XRD, etc. Tables 2, 3, 4A, 4B, and 5 provide information regarding various zeolites formed from different reaction conditions and compositional variation.

The effect of solution media ($H_2O$, $NH_4Cl$, or $NH_4NO_3$) on $(NH_4)_2SiF_6$ treatment is shown in Table 2. The solution media refers to the media in which the zeolite is in when contacted by the $(NH_4)_2SiF_6$, including any media combined with the zeolite prior to contact with the $(NH_4)_2SiF_6$ or any media mixed with the $(NH_4)_2SiF_6$ when added to the zeolite. The column listing "$NH_4NaY$" signifies the properties of the zeolite prior to contact by the $(NH_4)_2SiF_6$.

TABLE 2

|  | $NH_4NaY$ | $H_2O$ | $H_2O + NH_4NO_3$ | $H_2O + NH_4Cl$ |
| --- | --- | --- | --- | --- |
| $Na_2O$, wt % | 3.7 | 0.09 | 0.73 | 1.2 |
| $SiO_2/Al_2O_3$, molar ratio | 5.1 | 11.9 | 10.5 | 10.4 |
| Cell unit, Å | 24.67 | 24.50 | 24.47 | 24.47 |
| Relative crystallinity, % | 100 | 87 | 83 | 85 |

From the results shown in Table 2, it can be seen that the main properties of the product from only using de-ionized water as the media may be more desirable than those from $NH_4Cl$ and $NH_4NO_3$ media, especially the lower Na content in the product. Crystallinity is also greater for use of $H_2O$.

Under particular conditions, the ultra-stable zeolite Y with the properties shown in the Table 3 was prepared. Specifically, 100 g of NH$_4$NaY zeolite (Na$_2$O: 2.8 wt %) and 1000 ml deionized water was mixed and heated to 80-90° C. Under the stirring, 0.8 M of (NH$_4$)$_2$SiF$_6$ aqueous solution (400 ml) was drop added in 3 hours. The slurry was maintained at 90-95° C. for 2 hours. The slurry was then decanted. The top zeolite was washed two times with deionized water, and then dried at 110° C. overnight, and calcinated at 550° C. for 4 hours.

TABLE 3

| Na$_2$O, wt % | 2.5 | 0.04 |
|---|---|---|
| SiO$_2$/Al$_2$O$_3$ molar ratio | 5.3 | 10.2 |
| Cell unit, Å | 24.67 | 24.52 |
| Relative crystallinity, % | 100 | 102 |

Example 3—Fabrication and Characterization of Zeolite Y with and without Hydrothermal Treatment Additionally, experiments were performed to measure various properties of fabricated zeolite Y to study the effect of hydrothermal treatment during mesoporous zeolite fabrication. Before (NH$_4$)$_2$SiF$_6$ treatment, the NH$_4$$^+$ exchanged zeolite Y was hydrothermally treated under 550° C. and 0.1 MPa of auto-generated steam pressure for 1 hour in some samples, as shown in Table 4A. Sample 1 was a NH$_4$$^+$ exchanged commercially available zeolite Y (CBV-100 available from Zeolyst International). Sample 2 is representative of Sample 1 with additional hydrothermal treatment as described. Samples 3 and 4 represent the zeolites of Samples 1 and 2 following the (NH$_4$)$_2$SiF$_6$ treatment, respectively. Additionally, the conditions and comparison results between the various samples are summarized in Table 4A.

washed three times, dried at 120° C. overnight, and then calcinated at 600° C. for 4 hours (ramp: 2° C./min). As shown in Table 4B, the zeolite of Sample 3 following treatment by base and CTAB is Sample 5 and the zeolite of Sample 4 following treatment by base and CTAB is Sample 6.

TABLE 4B

| | Sample Name | |
|---|---|---|
| | Sample 5 | Sample 6 |
| Starting zeolite and treating process | Sample 3 + base + CTAB | Sample 4 + base + CTAB |
| Surface area, m$^2$/g | 896 | 803 |
| Pore volume, ml/g | 0.74 | 0.96 |
| Average pore sizes, nm | 4.6 | 8.2 |
| Mesopores ratio in total pores, % | 54 | 75 |

Example 4—Catalyst Fabrication and Testing

To compare the reaction performance of catalysts prepared from the presently disclosed mesoporous zeolite and those prepared from commercially available zeolite, two catalysts were synthesized.

To fabricate the catalyst that included the presently disclosed zeolite Y, 22.5 g of MoO$_3$, 29.2 g Ni(NO$_3$)$_2$.6H$_2$O, 15.5 g alumina (Puralox HP 14/150 from Sasol, pore volume: 0.9 ml/g), and 70 g of the mesoporous zeolite of Sample 5 of Example 3 were added into a mortar, mixed evenly, and then 140.3 g of the binder made from acid-peptized alumina (Catapal alumina from Sasol, pore volume: 0.5 ml/g, IOL: 80 wt %) was added and evenly mixed. An appropriate amount of water was added to form a dough

TABLE 4A

| | Sample Name | | | |
|---|---|---|---|---|
| | Sample 1 | Sample 2 | Sample 3 | Sample 4 |
| Starting zeolite and treating process | NH$_4$+ exchanged CBV-100 | Sample 1 + hydrothermal treatment | Sample 1 + (NH$_4$)$_2$SiF$_6$ treatment | Sample 2 + (NH$_4$)$_2$SiF$_6$ treatment |
| Si/Al molar ratio of starting zeolite | 2.5 | | 2.5 | 2.5 |
| Weight of starting zeolite (dry base), g | 60 | 25 | 20 | 20 |
| (NH$_4$)$_2$SiF6/zeolite mass ratio | | | 1.6 | 1.6 |
| Treating agent and concentration, | 2M NH$_4$NO$_3$ | | 0.8M (NH$_4$)$_2$SiF$_6$ | 0.8M (NH$_4$)$_2$SiF$_6$ |
| Solution volume, ml | 600 | | 200 | 200 |
| Treating conditions | | | | |
| Temperature, degrees C | 90 | 550 | 90 | 90 |
| Time, h | 1 | 1 | 2 | 2 |
| Pressure, MPa | | 0.1 MPa | | |
| Zeolite crystallinity, % | 100 | 89 | 102 | 73 |
| SiO$_2$/Al$_2$O$_3$ molar ratio | 5.2 | 5.2 | 11.0 | 16.3 |
| Na$_2$O, wt % | 2.8 | 2.8 | 0.07 | 0.05 |

Then, ten gram (dry base) of Sample 3 and Sample 4, respectively, were treated with NaOH basic solution and CTAB. Each of Samples 3 and 4 were added into 50 ml of 0.1 M NaOH aqueous solution, and stirred at 60° C. for 4 h. Meanwhile, in another beaker, 2.5 g of CTAB was mixed with 50 ml de-ionized water, vigorously stirred at room temperature for 4 hours. Then, CTAB was added dropwise solution into the zeolite slurry, and then stirred at room temperature for 24 hours. The mixture is transferred into a Teflon-lined autoclave, and treated in an oven at 120° C. for 48 hours. After that, the solid product was filtrated and that was suitable for extrudating in an extruder. The extrudate was dried at 120° C. overnight and calcinated at 500° C. for 4 hours (ramp: 2° C./min). The final catalyst composition was 15 wt % of MoO$_3$, 5 wt % of NiO, 50 wt % of the zeolite, and 30 wt % of Al$_2$O$_3$. This catalyst is referred to as Catalyst A in Table 5.

The catalyst with commercially available zeolite CBV-760 (Zeolyst International) was fabricated by adding 22.5 g of MoO$_3$, 29.2 g Ni(NO$_3$)$_2$.6H$_2$O, 15.5 g alumina (Puralox HP 14/150 from Sasol, pore volume: 0.9 ml/g), and 68 g of CBV-600 into a mortar and mixing evenly. To that mixture, 140.3 g of the binder made from acid-peptized alumina (Capapal alumina from Sasol, pore volume: 0.5 ml/g, IOL: 80 wt %) was added and evenly mixed. An appropriate amount of water was added to form a dough that was suitable for extrudating in an extruder. The extrudate was dried at 120° C. overnight and calcinated at 500° C. for 4 hours (ramp: 2° C./min). The final catalyst composition was 15 wt % of $MoO_3$, 5 wt % of NiO, 50 wt % of the commercial zeolite, and 30 wt % of $Al_2O_3$. This catalyst is referred to as Comparative Catalyst in Table 5.

Pilot plant tests were performed with the two catalysts under a temperature of 390° C., hydrogen pressure 150 bar, LHSV 0.2 $h^{-1}$, and hydrogen-to-oil volume ratio 1200:1. The feedstock was hydrotreated Arab light crude oil with a HDM/transaction/HDN catalyst system. The feed properties and testing results are summarized in Table 5. The results show that, with the catalyst including the presently described zeolite as the hydrocracking catalyst, the 540° C.+ residue can be completely converted, and the liquid product is good feedstock for steam cracking.

TABLE 5

| Hydrocracking catalyst | Feed | Catalyst A | Comparative Catalyst |
|---|---|---|---|
| Product properties | | | |
| Density | 0.8306 | 0.771 | 0.7988 |
| S, ppmw | 73 | 230 | 287.0 |
| N, ppmw | 5 | <5 | 3.0 |
| Product yield, wt % FF | | | |
| C1 | 0.3 | 0.4 | 0.39 |
| C2 | 0.3 | 0.6 | 0.48 |
| C3 | 0.4 | 2.1 | 1.15 |
| nC4 | 0.1 | 3.8 | 1.34 |
| iC4 | 0.4 | 2.7 | 1.38 |
| <180° C. | 18.4 | 53.3 | 30.03 |
| 180-350° C. | 41.4 | 31.7 | 45.60 |
| 350-540° C. | 30.5 | 3.2 | 15.18 |
| >540° C. | 8.4 | 0.0 | 4.78 |

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated herein.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Rather, the claims appended hereto should be taken as the sole representation of the breadth of the present disclosure and the corresponding scope of the various embodiments described herein.

Further, it will be apparent that modifications and variations are possible without departing from the scope of the appended claims.

What is claimed is:

1. A method for making a mesoporous zeolite, the method comprising:
   contacting an initial zeolite material with ammonium hexafluorosilicate in water to modify the framework of the initial zeolite material, forming a framework-modified zeolite material, the initial zeolite material comprising silica and alumina, and comprising an FAU framework type structure; and
   forming mesopores in the framework-modified zeolite material.

2. The method of claim 1, wherein the initial zeolite material comprises ammonium and sodium.

3. The method of claim 2, wherein the initial zeolite material is formed by ion-exchanging a zeolite comprising sodium with ammonium.

4. The method of claim 1, wherein forming the mesopores comprises:
   combining the framework-modified zeolite material with one or more of a base or a surfactant cetrimonium bromide to form a mixture; and
   heating the mixture to an elevated temperature for a heating time period to form the mesopores.

5. The method of any of claim 4, wherein the elevated temperature is from 100° C. to 150° C. and the heating time period is from 1 to 5 days.

6. The method of any of claim 4, wherein the base comprises an aqueous solution comprising one or more of NaO, KOH, or ammonium hydroxide.

7. The method of claim 1, wherein the surfactant is cetrimonium bromide.

8. The method of claim 1, wherein the separating comprises one or more of washing, drying, or calcining the nano-sized zeolite particles.

9. The method of claim 1, wherein the ammonium hexafluorosilicate that contacts the initial zeolite is in an aqueous solution.

10. The method of claim 9, wherein the ammonium hexafluorosilicate has a concentration of from 0.2M to 2.0M.

11. The method of claim 1, further comprising separating the zeolite comprising mesopores from the other contents of the mixture.

12. The method of claim 1, wherein the mesoporous zeolite has at least 90% crystallinity with respect to the initial zeolite.

13. A method of making a catalyst, the method comprising:
   forming a mesoporous zeolite by a method comprising:
      contacting an initial zeolite material with ammonium hexafluorosilicate in water to modify the framework of the initial zeolite material, forming a framework-modified zeolite material, the initial zeolite material comprising silica and alumina, and comprising an FAU framework type structure; and
      forming mesopores in the framework-modified zeolite material to form a mesoporous zeolite; and
   incorporating the mesoporous zeolite with a metal oxide support material and one or more metal catalyst materials to form the catalyst.

14. The method of claim 13, wherein one or more of the metal catalyst materials comprise an oxide or sulfide of W, Mo, Ni, or Co.

15. The method of claim 13, wherein the catalyst comprises an oxide or sulfide of W and an oxide or sulfide of Ni.

16. The method of claim 13, wherein the catalyst comprises an oxide or sulfide of Mo and an oxide or sulfide of Ni.

17. The method of claim 13, wherein the catalyst comprises:
   from 20 wt. % to 26 wt. % of an oxide or sulfide of W;
   from 4 wt. % to 6 wt. % of an oxide or sulfide of Ni;
   from 10 wt. % to 60 wt. % of the mesoporous zeolite; and
   from 10 wt. % to 70 wt. % of alumina.

18. The method of claim 13, wherein the catalyst comprises:
   from 14 wt. % to 16 wt. % of an oxide or sulfide of Mo;
   from 4 wt. % to 6 wt. % of an oxide or sulfide of Ni;
   from 10 wt. % to 60 wt. % of the mesoporous zeolite; and
   from 20 wt. % to 80 wt. % of alumina.

19. The method of claim 13, wherein the metal oxide support material comprises alumina.

20. The method of claim 13, wherein the mesoporous zeolite has at least 90% crystallinity with respect to the initial zeolite.

\* \* \* \* \*